(12) United States Patent　　(10) Patent No.: US 7,988,213 B2
Muhlfelder　　(45) Date of Patent: Aug. 2, 2011

(54) CARRYING HANDLE FOR BOTTLE

(76) Inventor: Philip S. Muhlfelder, Willoughby, OH (US)

( * ) Notice: Subject to any disclaimer, the term of this patent is extended or adjusted under 35 U.S.C. 154(b) by 0 days.

(21) Appl. No.: 11/563,921

(22) Filed: Nov. 28, 2006

(65) Prior Publication Data

US 2007/0241574 A1　　Oct. 18, 2007

Related U.S. Application Data

(60) Provisional application No. 60/744,844, filed on Apr. 14, 2006.

(51) Int. Cl.
*B65D 23/10*　　(2006.01)

(52) U.S. Cl. .................. 294/27.1; 294/31.1; 215/396

(58) Field of Classification Search ................. 294/27.1, 294/28, 30, 31.1, 31.2, 90, 104; 215/396; 16/425, 386
See application file for complete search history.

(56) References Cited

U.S. PATENT DOCUMENTS

| 2,598,747 | A | * | 6/1952 | Alex | 294/27.1 |
| 2,917,338 | A | * | 12/1959 | Blue | 294/31.2 |
| 3,101,211 | A | * | 8/1963 | Jones | 294/27.1 |
| 3,692,346 | A | * | 9/1972 | Simms | 294/27.1 |
| 4,456,135 | A | * | 6/1984 | Beekes | 215/396 |
| 5,385,277 | A | * | 1/1995 | Drew et al. | 222/474 |

* cited by examiner

*Primary Examiner* — Dean J Kramer

(57) ABSTRACT

A carrying device for bottle has a pair of hinged arms, one of which has a collar formed on it for receiving a beverage bottle neck, and the other of which has a pinch cam which engages the neck of the bottle, locking it within the collar, when the arms are squeezed together.

17 Claims, 4 Drawing Sheets

CARRYING HANDLE FOR BOTTLE

This application claims benefit of provisional U.S. patent application Ser. No. 60/744,844, filed Apr. 14, 2006.

BACKGROUND OF THE INVENTION

This invention relates to a carrying handle for a bottle. The handle employs a lever action across a hinge pin to temporarily secure the unit to the bottle. Once affixed, it can be used for carrying and manipulating the bottle, including pouring of its contents.

SUMMARY OF THE INVENTION

An object of the invention is to provide a simple, reusable handle which can be attached to a variety of common beverage containers.

Another object is to enable a person to carry a large bottle container with one hand, and to facilitate pouring of the container contents.

These and other objects are attained by a bottle carrying handle as described below.

BRIEF DESCRIPTION OF THE DRAWINGS

In the accompanying drawings.

DESCRIPTION OF THE PREFERRED EMBODIMENT

Figure 1:
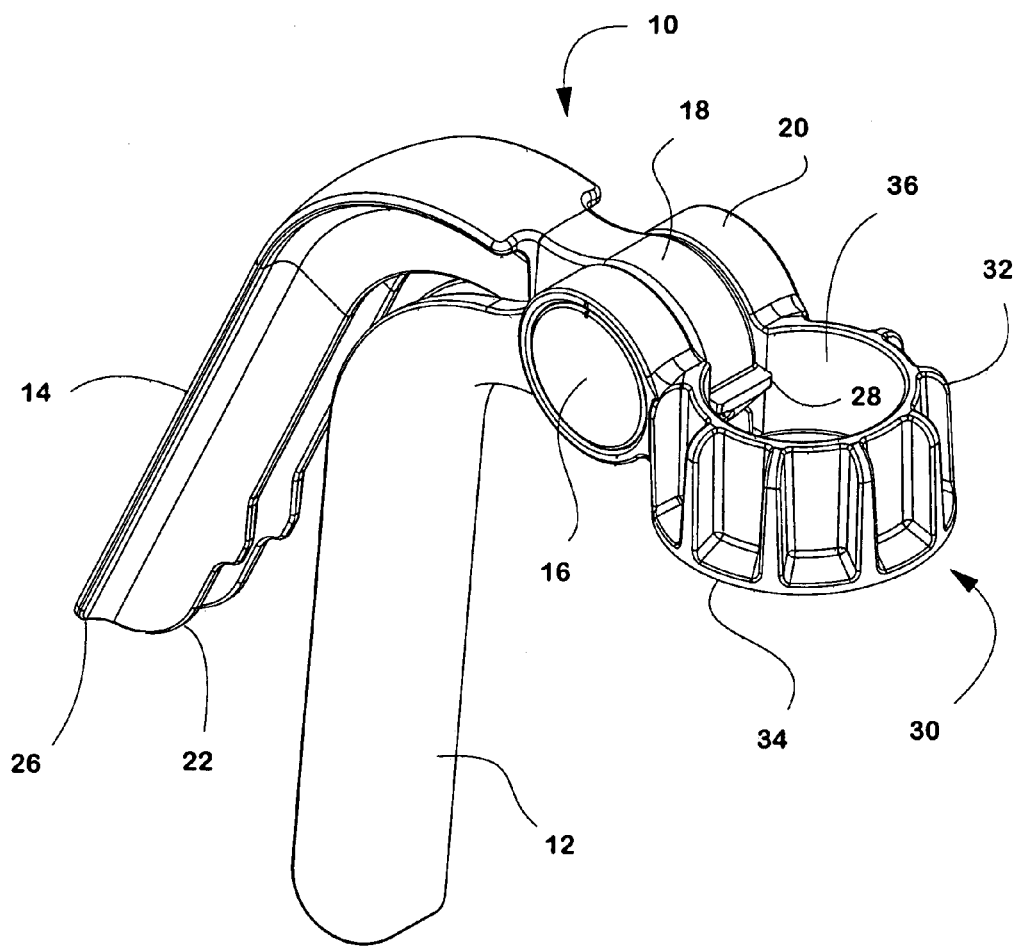
FIG. 1 is a perspective view, from the front and above, of a carrying handle embodying the invention.

A carrying handle 10 embodying the invention, as shown in FIG. 1, includes a lower arm 12 and an upper arm 14, which pivot with respect to one another about a hinge pin 16. The pin passes through a center knuckle 18 formed at the upper end of the upper arm 14, and a pair of spaced outer knuckles 19,20 formed at the upper end of the lower arm 12.

The upper arm 14 has a grasping portion 21 reinforced by a pair of ribs 22 which straddle a central reinforcing rib 24 (visible in FIG. 2) on the rear of a grasping portion 23 of the lower arm 12 when the arms are closed. The upper grasping portion 21 has lateral flanges 26 running most of its length to provide a broad bearing surface for the palm.

The upper arm's center knuckle 18 has a pinch cam 28 formed on its outer surface, diametrically opposite the arm 14. The pinch cam extends parallel to the axis of the pin 16, and has an upper surface 29 defined by a plane which extends radially from the pin axis.

The outer knuckles 19,20 support respective ends of a collar 30, which has reinforcing axial ribs 32 supporting a rim 34 at the bottom of the collar. This rim seats on the bottle's shoulder when in use. The collar is preferably formed integrally with the outer knuckles, which also are preferably integral with the grasping portion 23. The interior of the collar defines a throat 36 into which the neck of a beverage bottle may be inserted (alternatively, the throat may be placed over the neck of a beverage bottle at rest on a suitable surface).

Figure 2:
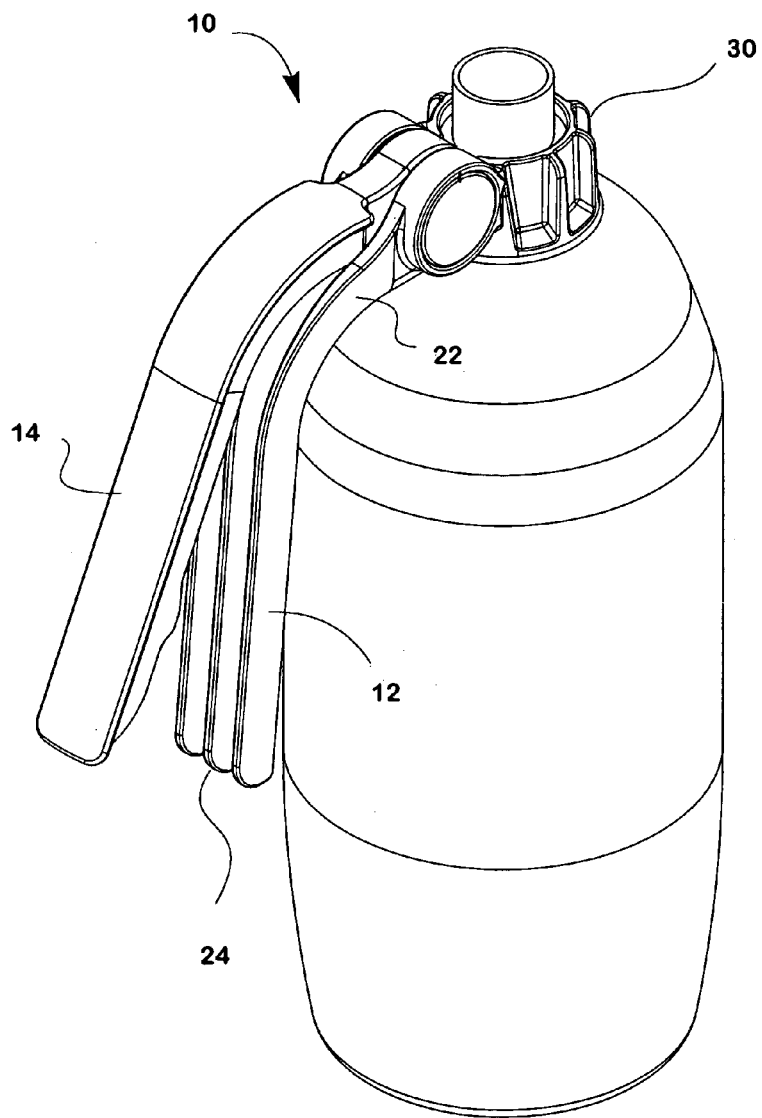
FIG. 2 is a perspective view thereof, from the rear and above, installed on the neck of a bottle.
Figure 3:
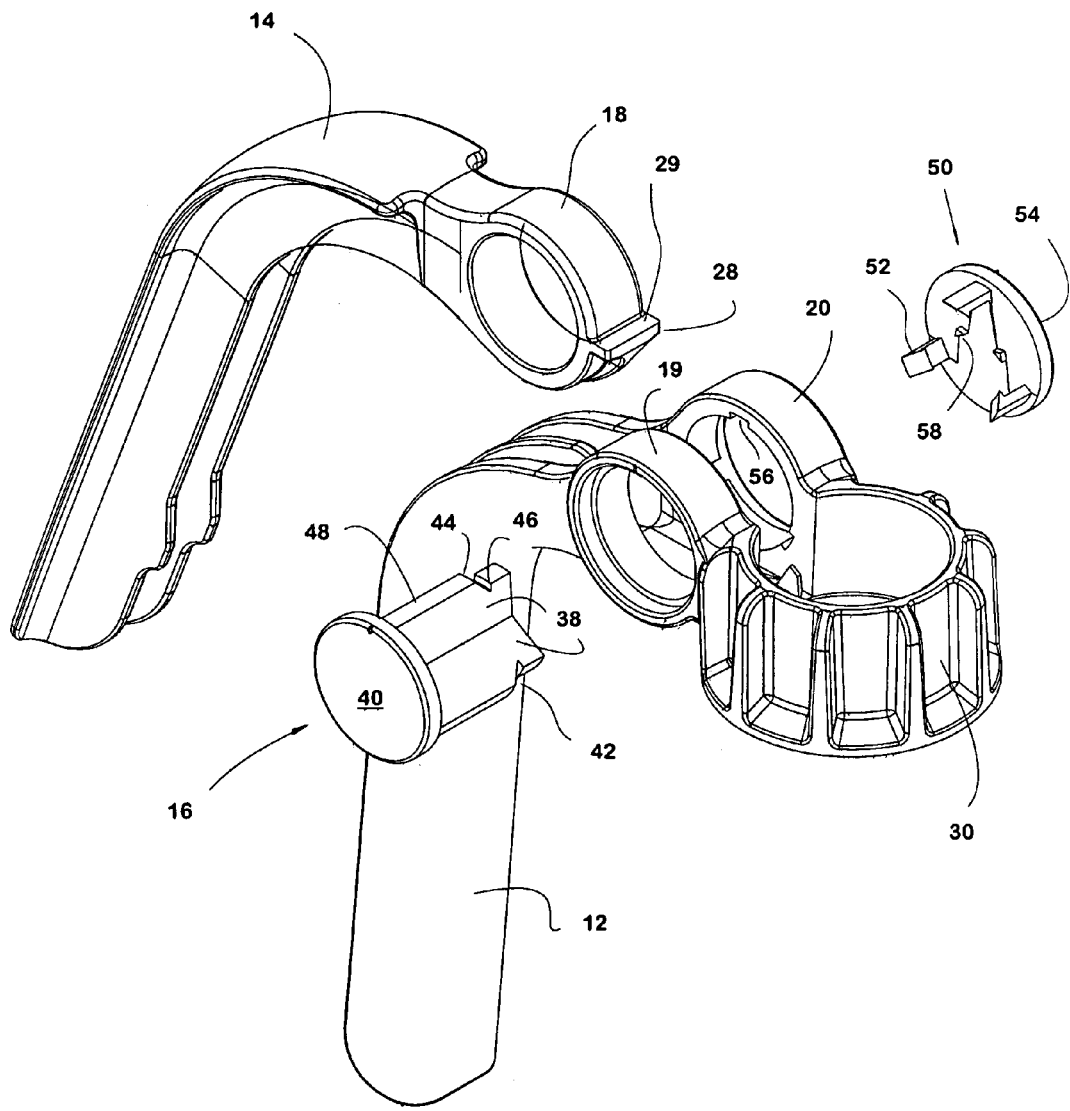
FIG. 3 is an exploded view of the handle components, again from the front and above.

FIG. 3 is an exploded view showing aspects of the structure not visible in FIGS. 1 and 2. In particular, the hinge "pin" 16 is revealed to comprise three identical vanes 38, each extending radially from the pivot axis, and a circular cap 40 attached to one end of the vanes. Each of the hinge's vanes has an detent 42 at the end opposite the cap. The detent comprises a beveled surface 44 facing away from the cap, and an orthogonal surface 46 with extends on a plane perpendicular to the pivot axis. The vanes 38 are sized so that their outer edges 48 bear against the inner cylindrical surfaces of the center knuckle 18 and of the outer knuckles 19,20. The hinge pin is retained in the knuckles by a retainer cap 50 having three prongs 52 that project axially from a disk 54 (the counterpart of the cap 40) toward the hinge pin. The number three (vanes and prongs) is merely the number presently preferred; any number greater than three is also possible. A solid pin might also be used, but molding the parts with vanes saves material and improves moldability.

The prongs slide in ways 56 (axial grooves) in the outer knuckle 20. The ways provide assembly clearance for the retainer prongs. When the hinge pin and the retainer are pushed together, the prongs 52 latch into the detents 42 of the hinge pin. The latching elements are hidden within the knuckles, where the hinge pin is free to rotate once assembly is complete. The parts cannot thereafter be disassembled. The small projections 58 on the inner surface of the retainer cap 54 nest against two of the vanes (see FIG. 4) to keep the parts axially aligned.

Figure 4:
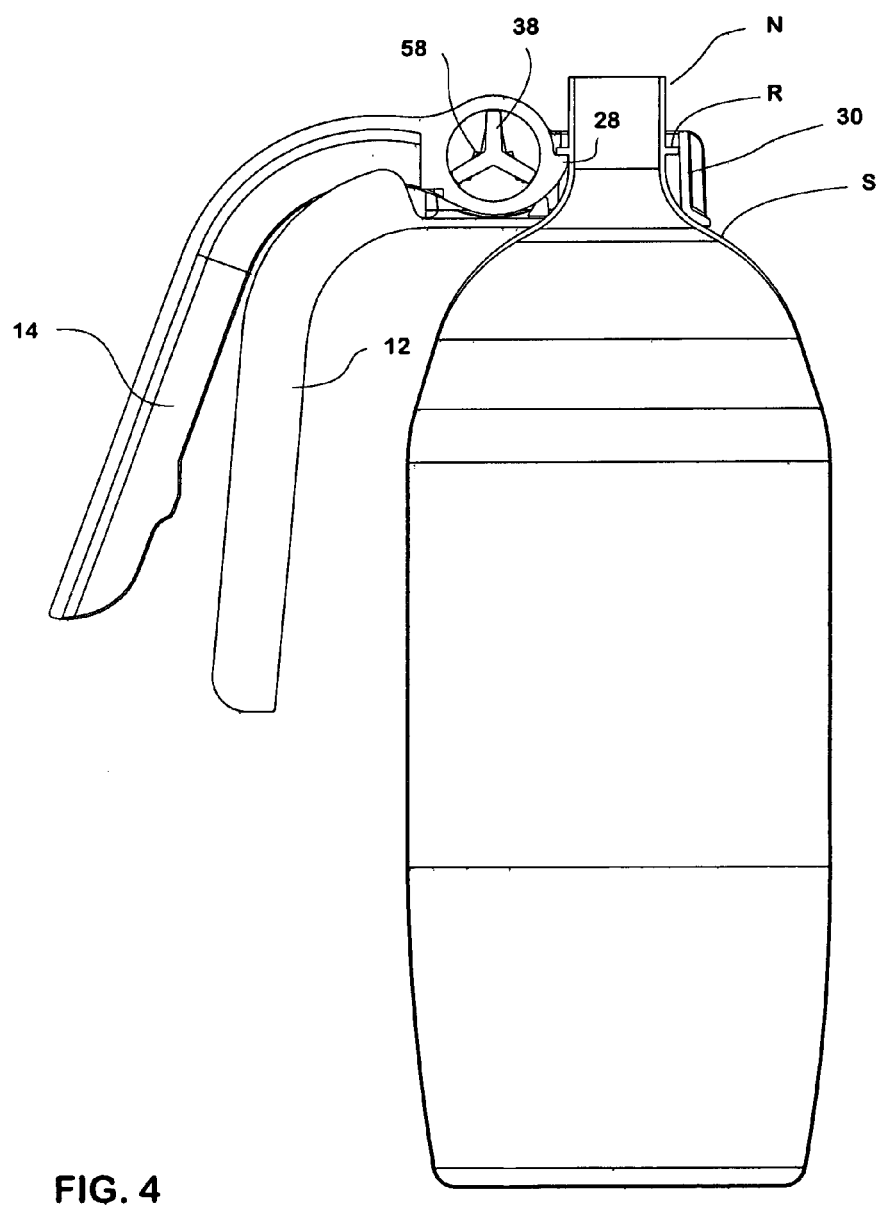
FIG. 4 is a sectional view thereof, taken on a vertical plane bisecting the bottle and the handle.

In use, one can grasp just the upper arm 14 with one hand, allowing gravity to open the arms, whereupon the pinch cam rotates downward so that it does not project into the throat. In this position a bottle neck N (FIG. 4) can be inserted into (or removed from) the throat with the other hand, or alternatively, the collar can be placed over the neck of a bottle at rest on a suitable surface. When the arms are squeezed together, the bottle is clamped securely, with the collar pressing downward on the bottle's shoulder S and the pinch cam pressing upward against the circumferential flange R on the bottle's neck, as shown in FIG. 4. In the squeezed position, the device can then be used to carry, or pour from, the bottle.

The bottle is disengaged by reversing the installation process. Grasping only the device's upper arm causes the pinch cam to again rotate downward to where it no longer projects into the throat, thus disengaging the bottle flange. In this configuration, the handle can then be lifted and removed from the bottle's neck with one hand.

It should be understood that the adjectives "upper" and "lower" are used above to identify the arms shown in the drawings, but these terms do not require a particular orientation, and it should be apparent that the handle is useful in all orientations.

Since the invention is subject to modifications and variations, it is intended that the foregoing description and the accompanying drawings shall be interpreted as only illustrative of the invention defined by the following claims.

I claim:

1. A carrying handle for a bottle, said handle comprising
    a first arm,
    a second arm hinged to the first arm for pivoting about a pivot axis with respect to the first arm,
    a collar attached to one of said arms, said collar defining a throat for receiving the neck of a beverage bottle,
    the other of said arms having a pinch cam formed thereon adapted to engage a portion of the bottle neck, to lock the bottle neck in the collar throat when the arms are squeezed together
    said arms being hingedly connected by a hinge pin comprising two parts having complementary structures which latch together.

2. The handle of claim 1, further comprising a plurality of knuckles, at least one of which is attached to each of said arms, said hinge pin passing through said knuckles.

3. The handle of claim 2, wherein said knuckles are formed integrally with the respective arms.

4. The handle of claim 2, wherein the collar is integrally formed with at least one of said knuckles.

5. The handle of claim 2, wherein the pinch cam projects into said throat when the arms are squeezed together, to secure a bottle in the throat, and the pinch cam withdraws from said throat when the arms are opened.

6. The handle of claim 1, wherein the complementary structures are prongs on one of said parts and detents on the other of said parts, said prongs being designed to latch into said detents.

7. The handle of claim 6, wherein one of said parts comprises a plurality of vanes which extend radially from the pivot axis, and each of the detents is formed on a respective one of said vanes.

8. The handle of claim 7, further comprising a pair of projections on one of said parts, each of said projections nesting against a respective one of said vanes to maintain the parts in axial alignment.

9. The handle of claim 1, wherein the collar has a plurality of axially extending ribs supporting a rim at the bottom of the collar.

10. A carrying handle for a bottle, said handle comprising
a first arm,
a second arm hinged to the first arm for pivoting about a pivot axis with respect to the first arm,
a collar attached to one of said arms, said collar defining a throat for receiving the neck of a beverage bottle,
the other of said arms having a pinch cam formed thereon adapted to engage a portion of the bottle neck, to lock the bottle neck in the collar throat when the arms are squeezed together, wherein
the first and second arms are hingedly interconnected by a plurality of knuckles, at least one of which is attached to each of said arms, and a hinge pin passing through said knuckles, and wherein
the collar is formed integrally with one of said knuckles.

11. The handle of claim 10, wherein said knuckles are formed integrally with the respective arms.

12. The handle of claim 10, wherein the pinch cam projects into said throat when the arms are squeezed together, to secure a bottle in the throat, and the pinch cam withdraws from said throat when the arms are opened.

13. The handle of claim 10, wherein the hinge pin comprises two parts having complementary structures which latch together within said knuckles.

14. The handle of claim 13, wherein the complementary structures are prongs on one of said parts and detents on the other of said parts, said prongs being designed to latch into said detents.

15. The handle of claim 14, wherein one of said parts comprises a plurality of vanes which extend radially from the pivot axis, and each of the detents is formed on a respective one of said vanes.

16. The handle of claim 15, further comprising a pair of projections on one of said parts, each of said projections nesting against a respective one of said vanes to maintain the parts in axial alignment.

17. The handle of claim 10, wherein the collar has a plurality of axially extending ribs supporting a rim at the bottom of the collar.

\* \* \* \* \*